United States Patent
Matsui

(10) Patent No.: US 7,774,138 B2
(45) Date of Patent: Aug. 10, 2010

(54) VEHICLE CONTROL DEVICE AND METHOD FOR CONTROLLING VEHICLE

(75) Inventor: Kazuhiro Matsui, Kariya (JP)

(73) Assignee: DENSO CORPORATION, Kariya (JP)

( * ) Notice: Subject to any disclaimer, the term of this patent is extended or adjusted under 35 U.S.C. 154(b) by 796 days.

(21) Appl. No.: 11/730,946

(22) Filed: Apr. 5, 2007

(65) Prior Publication Data

US 2007/0250268 A1    Oct. 25, 2007

(30) Foreign Application Priority Data

Apr. 24, 2006   (JP)   .............................. 2006-119172

(51) Int. Cl.
*G01C 21/00* (2006.01)
(52) U.S. Cl. ...................... 701/301; 701/207; 340/435; 340/436
(58) Field of Classification Search .............. 701/200, 701/207–208, 300–302; 340/425.5, 435–436
See application file for complete search history.

(56) References Cited

U.S. PATENT DOCUMENTS 7,103,460 B1 * 9/2006 Breed .......................... 701/29

FOREIGN PATENT DOCUMENTS

| JP | A-2000-82198  | 3/2000  |
| JP | A-2000-318634 | 11/2000 |
| JP | A-2001-99665  | 4/2001  |
| JP | A-2004-348254 | 12/2004 |

* cited by examiner

*Primary Examiner*—Yonel Beaulieu
(74) *Attorney, Agent, or Firm*—Posz Law Group, PLC

(57) ABSTRACT

A vehicle control device includes: a first memory for storing a road condition data; a position detector for detecting a position of a vehicle; a first controller for detecting and controlling unusual behavior of the vehicle; a driving condition detector for detecting a driving condition; an information acquiring element for acquiring weather information; a second memory for storing a driving data; a data acquiring element for acquiring the driving condition, the road condition data at an attention point, and the weather information; a memory controller for memorizing the attention spot in the second memory; a first optimum mode determining element for determining an optimum vehicle control mode based on the driving condition, the road condition data and the weather information; and a second controller for controlling the vehicle to coincide the driving condition with the optimum vehicle control mode before or at the attention spot.

8 Claims, 5 Drawing Sheets

| CONFIRM YOUR DRIVING CHARACTERISTICS | |
|---|---|
| ACCEL. OPERATION | SMALL ——○ LARGE |
| BRAKE OPERATION AT CURVE | LATE —○— RAPID |
| VEHICLE SPEED AT CURVE | LOW ——○ HIGH |
| STEERING OPERATION | SMALL —○— LARGE |

*ATTENTION!*
*· SLOW DOWN BEFORE CURVE*

ATTENTION!
SLIPPY SPOT 300m AHEAD
·SAFETY SPEED 30km/h

◎ TIRE WEARING

| | |
|---|---|
| ·RUNNING DISTANCE | 20,000km |
| ·NUMBER OF SLIPPING TIMES | |
|    1. STARTING/ACCELERATING | 20 TIMES |
|    2. TURNING | 5 TIMES |
| ·WEARING LEVEL | C RANK |
| ·DRIVING INFLUENCE | STEERING CAREFULLY AT CURVE |
| ·CHANGE TIRE WITHIN | 15,000km |

VEHICLE CONTROL DEVICE AND METHOD FOR CONTROLLING VEHICLE

CROSS REFERENCE TO RELATED APPLICATION

This application is based on Japanese Patent Application No. 2006-119172 filed on Apr. 24, 2006, the disclosure of which is incorporated herein by reference.

FIELD OF THE INVENTION

The present invention relates to a vehicle control device and a method for controlling a vehicle.

BACKGROUND OF THE INVENTION

There is formerly a device having a construction shown in JP-A-2000-82198 as the vehicle controller. In this device, seasons and the weather are uniformly judged from the present position of the vehicle and the present absolute time (date and time). For example, when the vehicle present position shows Hokkaido and the present absolute time shows a night time of the winter season, it is uniformly judged that a road surface is easily frozen. In this device, the running of the vehicle is automatically controlled (braking control at a speed exceeding time and steering control at a non-suitable time of a steering angle, etc.) at a necessary time in accordance with control characteristics (data for control) determined in advance to support the safe running of the vehicle in accordance with a road situation. Otherwise, when there is an abnormal behavior such as a wheel lock at an unexpected sudden brake time, a sideslip and a slip at a cornering time and a sudden accelerating time, etc., control corresponding to this abnormal behavior is performed.

In the above former construction, the actual weather such as fine weather, rain, snow, etc. is not acquired, and the actual circumstances are that no actual road surface situation is known. Namely, vehicle running control is not necessarily appropriately performed. Therefore, there is a fear that the vehicle is more or less slipped and is sideslipped in accordance with the weather.

Thus, it is required for a vehicle control system to perform vehicle state control conformed to the actual weather, and prevent the generation of a slip, a sideslip or a wheel rotating lock in advance.

SUMMARY OF THE INVENTION

In view of the above-described problem, it is an object of the present disclosure to provide a vehicle control device. It is another object of the present disclosure to provide a method for controlling a vehicle.

According to a first aspect of the present disclosure, a vehicle control device includes: a first memory for storing a road condition data, which includes a map data, a curve radius of a road and a road inclination angle of the road; a position detector for detecting a position of a vehicle; a first controller for detecting unusual behavior of the vehicle and for controlling the vehicle in response to the unusual behavior; a driving condition detector for detecting a driving condition of the vehicle; an information acquiring element for acquiring weather information; a second memory for storing a driving data; a data acquiring element for acquiring the driving condition as a compensation data, for acquiring the road condition data at a point where the first controller controls the vehicle in response to the unusual behavior, and for acquiring the weather information; a memory controller for operating the second memory to store the point as an attention spot in the second memory, the point where the first controller controls the vehicle in response to the unusual behavior; a first optimum mode determining element for determining an optimum vehicle control mode based on the compensation data at the attention spot, the road condition data and the weather information; and a second controller for controlling the vehicle in such a manner that the driving condition of the vehicle coincides with the optimum vehicle control mode when the vehicle runs through the attention spot or before the vehicle runs through the attention spot.

In the above device, the driving condition of the vehicle is appropriately controlled to meet the compensation data at the attention spot, the road condition data and the weather information when the vehicle runs through the attention spot or before the vehicle runs through the attention spot. Thus, the unusual behavior such as a tire slip, a skid and a wheel lock is preliminarily avoidable.

According to a second aspect of the present disclosure, a vehicle control device includes: a first memory for storing a road condition data, which includes a map data, a curve radius of a road and a road inclination angle of the road; a position detector for detecting a position of a vehicle; a first controller for detecting unusual behavior of the vehicle and for controlling the vehicle in response to the unusual behavior; a driving condition detector for detecting a driving condition of the vehicle; an information acquiring element for acquiring weather information; a second memory for storing a driving data; a data acquiring element for acquiring the driving condition as a compensation data, for acquiring the road condition data at a point where the first controller controls the vehicle in response to the unusual behavior, and for acquiring the weather information; a memory controller for operating the second memory to store the point as an attention spot in the second memory, the point where the first controller controls the vehicle in response to the unusual behavior; and a notification element for notifying the point of the attention spot in the map data.

In the above device, the driver preliminarily recognizes the point of the attention spot. Thus, the driver can avoid the unusual behavior by driving the vehicle in an appropriate manner.

According to a third aspect of the present disclosure, a method for controlling a vehicle includes: storing a road condition data in a first memory, wherein the road condition data includes a map data, a curve radius of a road and a road inclination angle of the road; detecting a position of the vehicle; detecting unusual behavior of the vehicle and controlling the vehicle in response to the unusual behavior; detecting a driving condition of the vehicle; acquiring weather information; storing a driving data in a second memory; acquiring the driving condition as a compensation data, the road condition data at a point where the vehicle is controlled in response to the unusual behavior, and the weather information; operating the second memory to store the point as an attention spot in the second memory, the point where the vehicle is controlled in response to the unusual behavior; determining an optimum vehicle control mode based on the compensation data at the attention spot, the road condition data and the weather information; and controlling the vehicle in such a manner that the driving condition of the vehicle coincides with the optimum vehicle control mode when the vehicle runs through the attention spot or before the vehicle runs through the attention spot.

In the above method, the driving condition of the vehicle is appropriately controlled to meet the compensation data at the attention spot, the road condition data and the weather information when the vehicle runs through the attention spot or before the vehicle runs through the attention spot. Thus, the unusual behavior such as a tire slip, a skid and a wheel lock is preliminarily avoidable.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
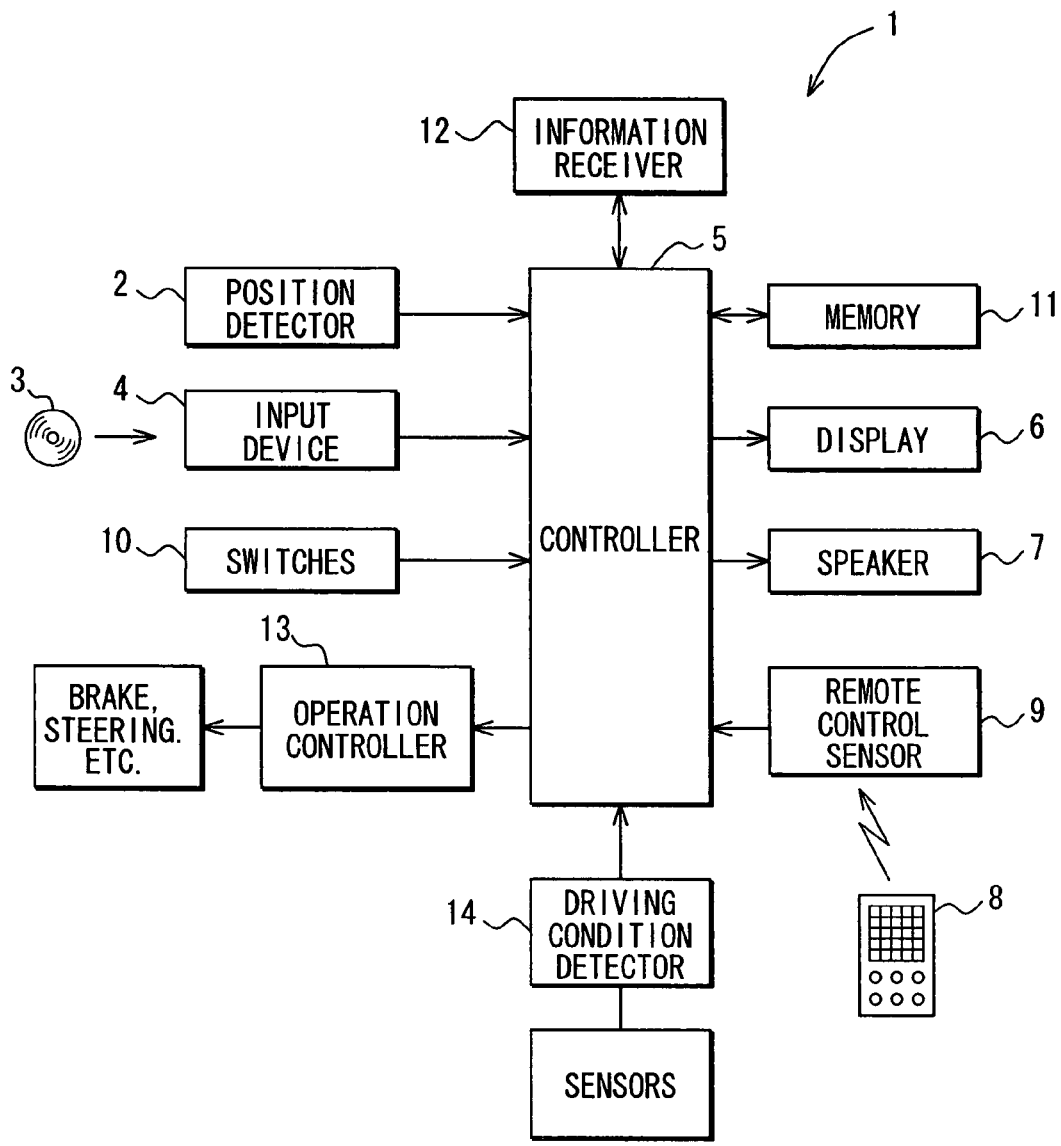
FIG. 1 is a block diagram showing a vehicle controller.

FIG. 1 shows the entire construction of a vehicle controller 1 mounted to a vehicle. In FIG. 1, the vehicle controller 1 is constructed by arranging a position detector 2, a map data input device 4 for reading map data from a map data recording medium 3 (corresponding to a map data memory means) such as CD-ROM, DVD-ROM, etc., and a controller 5 for executing various kinds of processings required in navigation and various kinds of processings required in vehicle control. The vehicle controller 1 is also constructed by arranging a display device 6 as a notifying means for displaying a map, etc., a voice output device 7 as a notifying means for outputting a voice, and a remote controller sensor 9 for receiving a signal from a remote controller 8. The vehicle controller 1 is also constructed by arranging an operation switch group 10 for performing various kinds of operations required in navigation, an external memory 11, and an external information receiving section 12 as a weather information acquiring means. The vehicle controller 1 is further constructed by arranging an operation control function section (i.e., operation controller) 13 and a vehicle running situation detecting function section (i.e., driving condition detector) 14.

The above position detector 2 corresponds to a self vehicle position detecting means for detecting a vehicle position. This position detector 2 is constructed by arranging an inclination sensor (pitch angle sensor), a gyroscope, a distance sensor and a GPS receiver although these devices are not illustrated in the drawings. Vehicle position information and time information are included in a GPS signal received by the GPS receiver.

Map data used in map display, map data used in map matching, map data used in a path guide, position data of various kinds of facilities, etc. are included in the above map data recording medium 3. Further, a node (including a spot as a main point, and an intersecting point (branching portion)) of a road is set in each map data mentioned above. Further, road situation data such as a curve radius of the road, a road surface inclination angle, etc. are also included in each map data.

The above controller 5 is constructed by including CPU, ROM and RAM. Programs relative to destination place setting, route setting, voice guide, display control, vehicle control, etc. are stored to ROM. This controller 5 also functions as a vehicle behavior corresponding control means, a data acquiring means, a running attention spot memory control means, a vehicle control mode indexing means, a vehicle running state control means, a position notifying control means, an operation characteristics indexing means, an appropriate vehicle control information notifying control means, a tire wearing degree judging means, and a tire wearing degree notifying control means.

The actual vehicle running situation detecting information is inputted from the vehicle running situation detecting function section 14 corresponding to a vehicle running situation detecting means to this controller 5. This vehicle running situation detecting information includes information such as a vehicle speed using a vehicle speed sensor, a handle steering angle using a steering sensor, acceleration and deceleration using a G-sensor, an accelerator aperture using an accelerator sensor, and a brake stepping-in amount and a stepping-in time number using a brake sensor.

The above operation switch group 10 and the remote controller 8 are input means and are arranged to perform various kinds of settings.

The above external memory 11 corresponds to a running data memory means.

For example, this external memory 11 is constructed by arranging a hard disk and a hard disk drive for operating this hard disk.

The vehicle behavior corresponding control means in the above controller 5 performs corresponding control (antilock control, a sideslip preventing function, traction control, etc.) when there are a wheel lock, a sideslip and a slip.

The above external information receiving section 12 is constructed from a vehicle mounting data communication module, and can communicate with an information network for a vehicle mounting terminal, and can acquire the present weather information.

Figure 2:
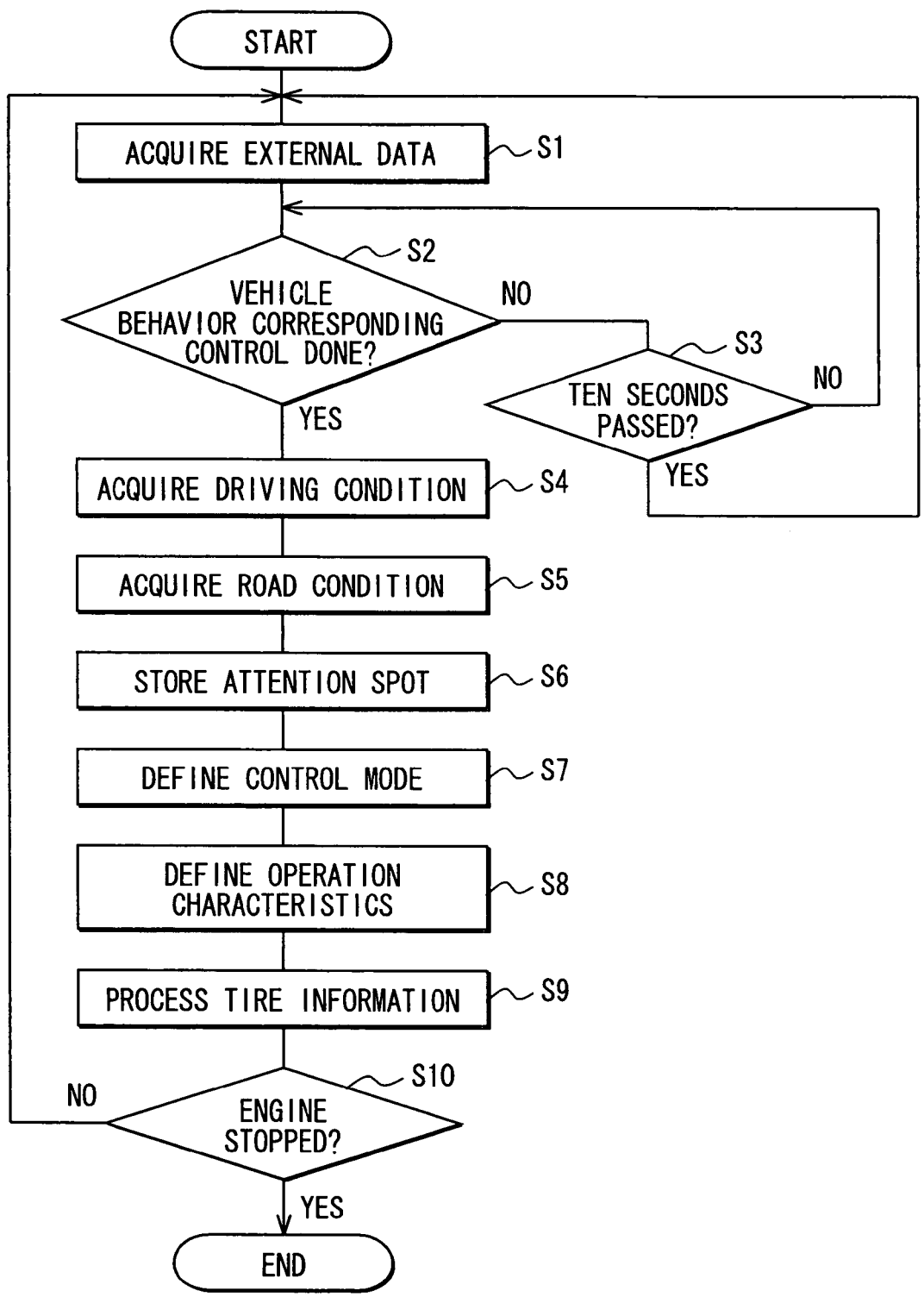
FIG. 2 is a flow chart showing a process for acquiring various data.
Figure 3:
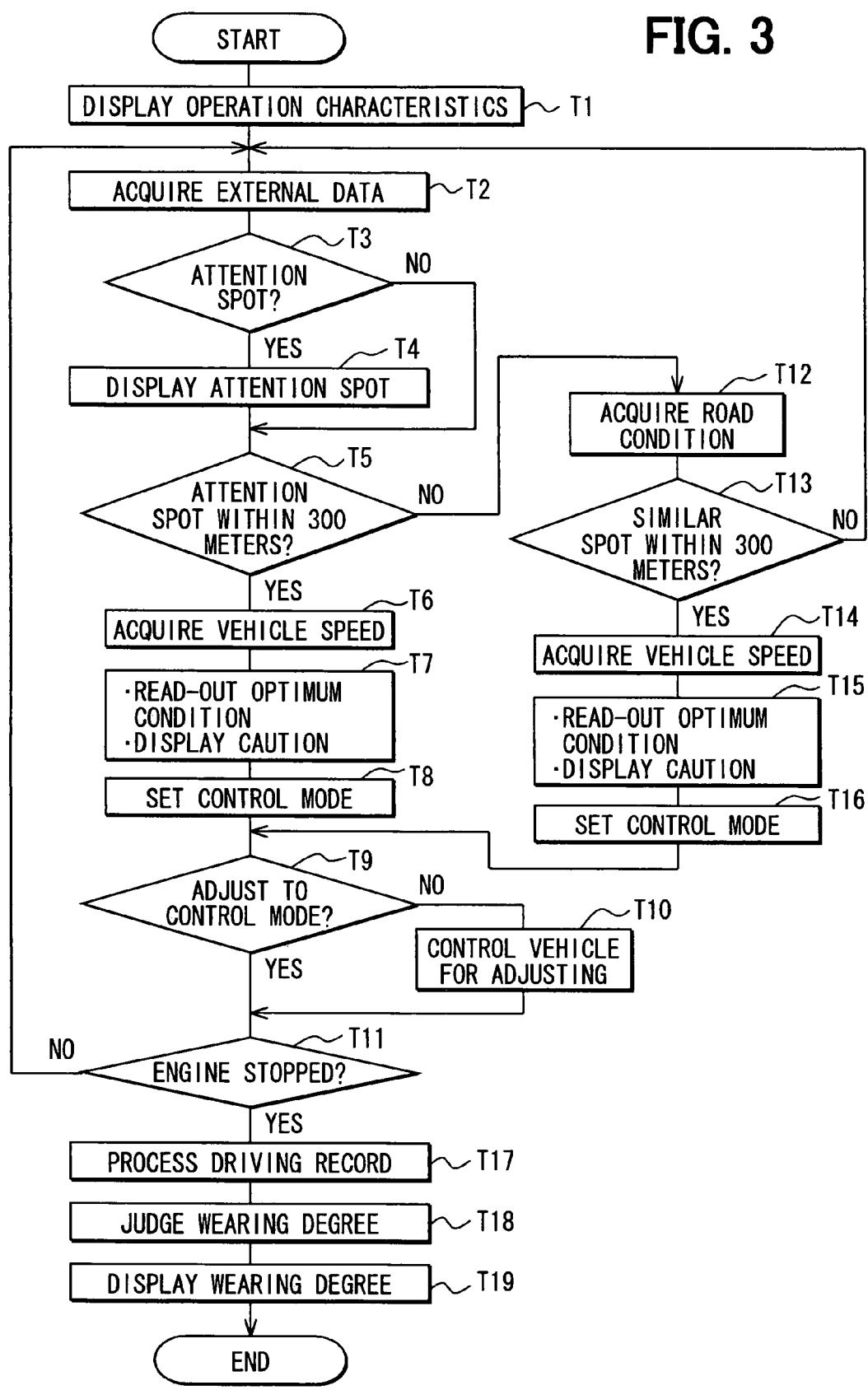
FIG. 3 is a flow chart showing a process for controlling vehicle driving condition.

A control operation of the controller 5 (also including the operations of the vehicle behavior corresponding control means, the data acquiring means, the running attention spot memory control means, the vehicle control mode indexing means, the vehicle running state control means, the position notifying control means, the operation characteristics indexing means, the appropriate vehicle control information notifying control means, the tire wearing degree judging means, and the tire wearing degree notifying control means) will be explained with reference to the flow charts of FIGS. 2 and 3.

The flow chart of FIG. 2 and the flow chart of FIG. 3 are simultaneously operated in parallel. First, the flow chart of FIG. 2 will be described. First, in step S1, vehicle exterior data acquiring control is executed (data acquiring means). In this vehicle exterior data acquiring control, various kinds of map data are acquired (read) from the map data recording medium 3, and a self vehicle position is acquired from the position detector 2, and weather information is acquired from the external information receiving section 12. Information such as distinction of fine weather, cloudiness and rain, air temperature, a rain amount (also including a snowfall amount) at the time of rain, humidity, etc. is included in this weather information.

In step S2, it is judged whether vehicle behavior corresponding control is performed or not. If no vehicle behavior corresponding control is performed, it proceeds to step S3, and it is judged whether, e.g., 10 seconds have passed from the vehicle exterior data acquiring control (step S1) of the previous time or not. If these ten seconds have not passed, the judgment of the vehicle behavior corresponding control operation of step S2 is executed. If the above ten seconds then have passed, step S1 is again executed.

When it is judged in the above step S2 that the operation of the vehicle behavior corresponding control is performed, it proceeds to step S4, and various vehicle running situation information (i.e., driving conditions) is acquired from the vehicle running situation detecting function section 14. As mentioned above, information such as a vehicle speed, a handle steering angle, acceleration and deceleration, an accelerator aperture, a brake stepping-in amount and a stepping-in time number is included in this vehicle running situation information. This vehicle running situation information is acquired as correction data. Further, a road frictional coefficient $\mu$ is calculated separately from the correction data. This road frictional coefficient $\mu$ is calculated on the basis of a speed, vehicle inertial force, etc. at the generating time of a slip and a sideslip.

In the next step S5, a road situation (i.e., road condition) is acquired from the above map data. A curve radius and a road surface inclination angle are included in this road situation.

In the next step S6, a running spot performed with respect to the operation of the vehicle behavior corresponding control is stored to the external memory 11 as a running attention spot (running attention spot memory control means). In step S7, an optimum vehicle control mode for vehicle running state control is made and stored every weather/rain amount and road situation from the above correction data (vehicle control mode indexing means). An optimum approach speed, an optimum handle steering angle, etc. are included in this made vehicle control mode.

In the next step S8, operation characteristics indexing processing (operation characteristics indexing means) of a driver is performed. In this judgment processing, characteristics (habit) of the steering angle of the handle every curve radius of a road acquired in step S4, characteristics of brake timing every deceleration ratio similarly acquired in step S4, and characteristics of the accelerator aperture at starting and accelerating times acquired in step S4 are index-processed.

In step S9, tire information statistical processing is performed. This statistical processing is statistical processing performed to judge the wearing degree of a tire. An operation time number of vehicle running automatic control is counted and stored, and a slip level (racing value) is judged and stored. Control of the above steps S1 to S9 is terminated by engine stoppage (judged in step S10).

Figures 4, 5:
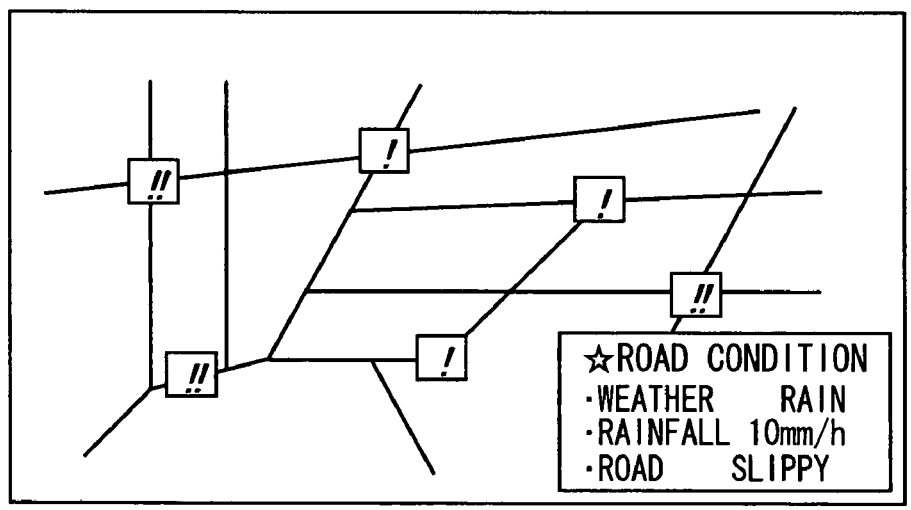
FIG. 4 is a view showing an example of display of driving characteristics of a driver.
FIG. 5 is a view showing an example display of a driving attention spot.

The flow chart of FIG. 3 will next be explained. For example, when the engine is started, this flow chart is started. First, in step T1, operation characteristics (operation characteristics obtained in step S7) obtained until the running of the previous time are displayed (notified) in the display device 6, and a voice is outputted to the voice output device 7 (operation characteristics notifying control means). This display example is shown in FIG. 4. In FIG. 4, the display of "confirm your driving characteristics" means "please confirm your driving operation characteristics before you drives a car." The expression of "accel. operation" means "acceleration opening degree at starting or accelerating," "small" means that the acceleration opening degree is small, and "large" means that the acceleration opening degree is large. The expression of "brake operation at curve" means "brake operation timing at a curve," "late" means that the driver brakes late before the curve, and "rapid" means that the driver brakes rapidly before the curve. The expression of "vehicle speed at curve" means "vehicle speed at a curve," "low" means that the driver drives a car at low speed during the curve, and "high" means that the driver drives a car at high speed during the curve. The expression of "steering operation" means "a turning angle of a steering wheel per one time," "small" means that the driver turns the steering wheel with a small turning angle per one time, and "large" means that the driver turns the steering wheel with a large turning angle per one time. The expression of "attention" means "one-point advice for the driver." In step T2, vehicle exterior data acquiring control is executed. In this vehicle exterior data acquiring control, various kinds of map data are acquired (read) from the map data recording medium 3, and a self vehicle position is acquired from the position detector 2, and weather information is acquired from the external information receiving section 12. Information such as distinction of fine weather, cloudiness and rain, air temperature, a rain amount (also including a snowfall amount) at the time of rain, humidity, etc. is included in this weather information.

In the next step T3, it is judged whether the running attention spot is located within a predetermined range, e.g., 1 km from the present running spot of the self vehicle. If the running attention spot is located within this predetermined range, the running attention spot located within the predetermined range is displayed (notified) in the display device 6 (position notifying control means). This display example is shown in FIG. 5. In this case, mark "!" shows the running attention spot, and a spot having many marks "!!" shows a spot requiring more attention. In this case, the weather and the road surface situation of a road are also displayed.

In the next step T5, the approach into the running attention spot is decided or estimated, and it is judged whether the vehicle is located by, e.g., 300 meters before the running attention spot or not. When the judgment is "YES", it proceeds to step T6 and a running speed is acquired. In step T7, an optimum approach speed (calculated in step T7) is read out, and this optimum approach speed and an attention matter are displayed (notified) in the display device 6, and a voice is outputted to the voice output device 7 (appropriate vehicle control information notifying control means).

In step T8, the vehicle control mode according to the present weather information among the vehicle control mode obtained in step T7 is set as data for controlling a vehicle running state. Further, it is judged in step T9 whether a detecting result of each vehicle running situation is conformed to the above vehicle control mode from the vehicle running situation detecting function section 14 or not. If no detecting result is conformed to the above vehicle control mode, it proceeds to step T10 and the vehicle running state is controlled through the operation control function section 13 such that the detecting result is conformed to the vehicle control mode (vehicle running state control means). In contrast to this, when the detecting result is conformed to the vehicle control mode, it is judged that the vehicle running state is a state having no obstacle to approach the running attention spot, and the above step T10 is not executed.

Thereafter, it proceeds to step T11. If no operation of the engine is stopped (if the running is continued), it is returned to step T2.

When it is judged in the above step T5 that no approach destination of the vehicle is the running attention spot, a road situation is acquired in step T12. It is then judged in step T13 whether an approaching spot of the vehicle or an estimating spot of the approach is a spot similar to the running attention spot and is located within e.g., 300 meters or not. In step T14, the running speed is acquired. In step T15, similar to step T7, an optimum approach speed (calculated in step T7) is read out and this optimum approach speed and an attention matter are displayed (notified) in the display device 6. In step T16, similar to step T8, the vehicle control mode according to the present weather information among the vehicle control mode obtained in step S7 is set as data for controlling the vehicle running state. Thereafter, it proceeds to the above step T9 and it is judged whether the detecting result of each vehicle running situation is conformed to the above vehicle control mode from the vehicle running situation detecting function section 14 or not. If no detecting result is conformed to the vehicle control mode, it proceeds to step T10 and the vehicle running state is controlled through the operation control function section 13 such that the detecting result is conformed to the vehicle control mode.

When the operation of the engine is stopped ("YES" in step T11), accumulation running actual result statistical processing from engine starting to stoppage (i.e., statistical processing total driving record) is executed in step T17. In step T18, tire wearing degree judgment processing (tire wearing degree judging means) is executed and terminated. The accumulation running actual result statistical processing is performed with respect to each of the following items.

(a) Rainy weather running distance (straight advance)
(b) Fine weather running distance (straight advance)
(c) Rainy weather running distance (every curve and running speed)
(d) Fine weather running distance (every curve and running speed)
(e) Start-acceleration distance every road surface inclination angle
(f) Brake operating distance (every deceleration ratio)

In tire wearing degree judging value calculation processing of step T18, the sum total of:

the distance of the above (a) multiplied by road frictional coefficient $\mu$ (acquired in step S4) at rainy weather time;

the distance of the above (b) multiplied by road frictional coefficient $\mu$ (acquired in step S4) at fine weather time;

the distance of the above (c) multiplied by road frictional coefficient $\mu$ at rainy weather time multiplied by rainy weather curve characteristic coefficient Ku (this is supposed to be suitably set in advance);

the distance of the above (d) multiplied by road frictional coefficient $\mu$ at fine weather time multiplied by fine weather curve characteristic coefficient Ks (this is supposed to be suitably set in advance);

the distance of the above (e) multiplied by, e.g., road frictional coefficient $\mu$ at fine weather time multiplied by inclination angle coefficient $\alpha$ (this is supposed to be suitably set in advance) multiplied by acceleration coefficient $\beta$ (this is supposed to be suitably set in advance); and the distance of the above (f) multiplied by, e.g., road frictional coefficient $\mu$ at fine weather time multiplied by deceleration coefficient $\gamma$ (this is supposed to be suitably set in advance), is evaluated at, e.g., five stage levels of A to E.

Figures 6, 7:
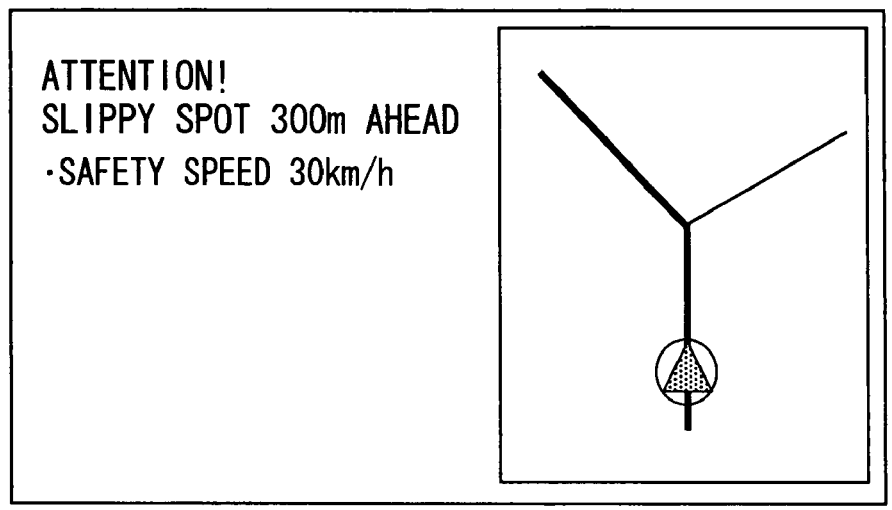
FIG. 6 is a view showing an example of display of vehicle control information.
FIG. 7 is a view showing an example of display of tire wearing degree.

In step T19, the above tire wearing degree, etc. are displayed (notified) as shown in FIG. 7 (tire wearing degree notifying control means). This display may be also performed at an engine starting time. In FIG. 7, the expression of "running distance" means "a total driving distance after changing tire." The expression of "wearing level" means "estimated tire wearing degree." The expression of "driving influence" means "advice for driving" or "influence of driving a car." The expression of "change tire within" means "rough estimation of driving distance for safety drive."

In accordance with such an embodiment, when an abnormal behavior such as a slip and a sideslip of the vehicle or a wheel rotating lock, etc. is detected and a corresponding control operation is executed, a vehicle control situation is acquired as correction data at that time point. Further, road situation data of a running spot at the operating time point and weather information are acquired, and the running spot at the operating time point is stored as the running attention spot. On he basis of the above correction data in the running attention spot, an optimum vehicle control mode in the running attention spot is indexed in accordance with the road situation and the weather information. When the vehicle approaches the above running attention spot or the approach is estimated, the above vehicle control mode according to the above weather information at the present time point is set. When no vehicle running situation detecting result is conformed to the vehicle control mode, the running state of the vehicle is controlled such that the vehicle running situation detecting result is conformed to the vehicle control mode. Accordingly, vehicle running state control conformed to the actual weather can be performed as well as the road situation in the running attention spot. Thus, generation of a slip, a sideslip or a wheel rotating lock can be prevented in advance.

In particular, in accordance with this embodiment, the vehicle control mode according to the weather at the present time point is also set when the above vehicle approaches a similar spot of the road situation close to the road situation of the above running attention spot or the approach is estimated in addition to the running attention spot. When no vehicle running situation detecting result is conformed to the vehicle control mode, the running state of the vehicle is controlled such that the vehicle running situation detecting result is conformed to the vehicle control mode. Accordingly, when the vehicle passes a spot similar to the running attention spot with respect to the road situation, similar to a passing case of the running attention spot, an appropriate vehicle control mode can be also set, and generation of a slip, a sideslip or a wheel rotating lock can be prevented in advance.

Further, in accordance with this embodiment, when the vehicle approaches the running attention spot or the approach is estimated, the position of a map of the running attention spot is notified to the display device 6. Accordingly, a driver can recognize the running attention spot and a prudent vehicle operation can be promoted.

Furthermore, in accordance with this embodiment, operation characteristics of the driver in the above running attention spot are indexed from acquired various information and data, and are displayed in the display device 6. Accordingly, it is possible for the driver to recognize the operation characteristics easily causing a slip, a sideslip or a wheel rotating lock, and a prudent vehicle operation can be concretely notified.

Further, in accordance with this embodiment, when the vehicle approaches the running attention spot or the approach is estimated, a vehicle running speed is acquired and proper vehicle control information is indexed and displayed to the driver in the display device 6 from this vehicle running speed and the above vehicle control mode. Accordingly, information for vehicle control such as brake timing, a steering operation angle, etc. can be notified to the driver in accordance with the running speed of the vehicle passing the running attention spot. Thus, generation of a slip, a sideslip or a wheel rotating lock can be prevented in advance.

Further, in accordance with this embodiment, the wearing degree of a tire of the vehicle is judged, and display relative to the tire wearing degree is performed in the display device 6 on the basis of this judging result. Accordingly, the tire wearing degree can be conveniently notified to the driver.

Information may be also acquired from VICS (registered trademark) as a weather information acquiring means. Various notifications may be also performed by the voice output device 7 as well as the display device 6. A device except for a hard disk drive may be also used as a running data memory means.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A vehicle control device comprising:
   a first memory for storing a road condition data, which includes a map data, a curve radius of a road and a road inclination angle of the road;
   a position detector for detecting a position of a vehicle;
   a first controller for detecting unusual behavior of the vehicle and for controlling the vehicle in response to the unusual behavior;
   a driving condition detector for detecting a driving condition of the vehicle;
   an information acquiring element for acquiring weather information;
   a second memory for storing a driving data;
   a data acquiring element for acquiring the driving condition as a compensation data, for acquiring the road condition data at a point where the first controller controls the vehicle in response to the unusual behavior, and for acquiring the weather information;
   a memory controller for operating the second memory to store the point as an attention spot in the second memory, the point where the first controller controls the vehicle in response to the unusual behavior;
   a first optimum mode determining element for determining an optimum vehicle control mode based on the compensation data at the attention spot, the road condition data and the weather information; and
   a second controller for controlling the vehicle in such a manner that the driving condition of the vehicle coincides with the optimum vehicle control mode when the vehicle runs through the attention spot or before the vehicle runs through the attention spot.

2. The device according to claim 1, wherein
   the second controller controls the vehicle in such a manner that the driving condition of the vehicle coincides with the optimum vehicle control mode when the vehicle runs through a spot similar to the attention spot or before the vehicle runs through the spot similar to the attention spot.

3. The device according to claim 1, further comprising:
   a notification element; and
   a notification element controller for controlling the notification element to notify a position of the attention spot in the map data when the vehicle runs through the attention spot or before the vehicle runs through the attention spot, wherein
   the position of the attention spot is stored in the second memory.

4. The device according to claim 1, further comprising:
   a notification element;
   a driving characteristics determining element for determining driving characteristics of a driver of the vehicle at the attention spot based on the driving condition, the road condition data and the weather information; and
   a notification element controller for controlling the notification element to notify the driving characteristics.

5. The device according to claim 1, further comprising:
   a notification element;
   a second optimum mode determining element for determining an optimum vehicle control information for the driver based on the optimum vehicle control mode and a vehicle speed, wherein the vehicle speed is detected by the driving condition detector when the vehicle runs through the attention spot or before the vehicle runs through the attention spot; and
   a notification element controller for controlling the notification element to notify the optimum vehicle control information.

6. The device according to claim 1, further comprising:
   a notification element;
   a tire wearing detector for determining a wearing degree of a tire in the vehicle; and
   a notification element controller for controlling the notification element to notify the wearing degree of the tire.

7. A vehicle control device comprising:
   a first memory for storing a road condition data, which includes a map data, a curve radius of a road and a road inclination angle of the road;
   a position detector for detecting a position of a vehicle;
   a first controller for detecting unusual behavior of the vehicle and for controlling the vehicle in response to the unusual behavior;
   a driving condition detector for detecting a driving condition of the vehicle;
   an information acquiring element for acquiring weather information;
   a second memory for storing a driving data;
   a data acquiring element for acquiring the driving condition as a compensation data, for acquiring the road condition data at a point where the first controller controls the vehicle in response to the unusual behavior, and for acquiring the weather information;
   a memory controller for operating the second memory to store the point as an attention spot in the second memory, the point where the first controller controls the vehicle in response to the unusual behavior; and
   a notification element for notifying the point of the attention spot in the map data.

8. A method for controlling a vehicle comprising:
   storing a road condition data in a first memory, wherein the road condition data includes a map data, a curve radius of a road and a road inclination angle of the road;
   detecting a position of the vehicle;
   detecting unusual behavior of the vehicle and controlling the vehicle in response to the unusual behavior;
   detecting a driving condition of the vehicle;
   acquiring weather information;
   storing a driving data in a second memory;
   acquiring the driving condition as a compensation data, the road condition data at a point where the vehicle is controlled in response to the unusual behavior, and the weather information;
   operating the second memory to store the point as an attention spot in the second memory, the point where the vehicle is controlled in response to the unusual behavior;
   determining an optimum vehicle control mode based on the compensation data at the attention spot, the road condition data and the weather information; and
   controlling the vehicle in such a manner that the driving condition of the vehicle coincides with the optimum vehicle control mode when the vehicle runs through the attention spot or before the vehicle runs through the attention spot.

* * * * *